Dec. 22, 1942.  E. BENTZ ET AL  2,305,804
LAMINATED COATING
Filed Jan. 30, 1939
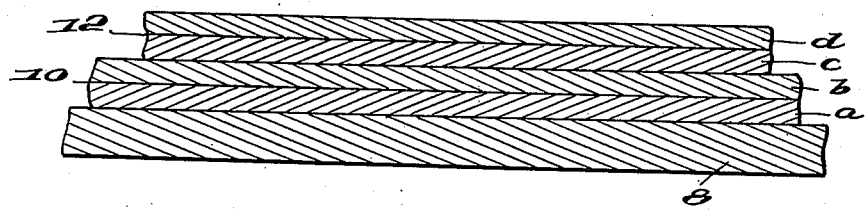
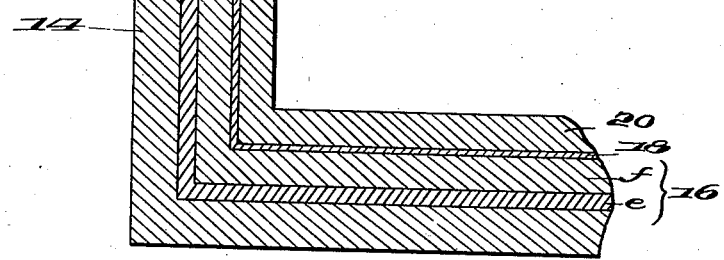
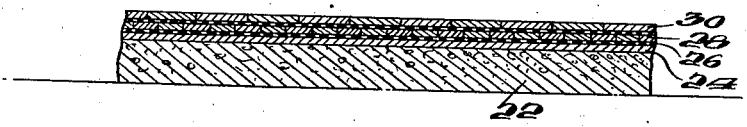
Inventors
EUGENE BENTZ,
HANS BURCK,
FRITZ HEINRICH,
JOHANNES JAENICKE,
HERMANN MIEDEL,
HERBERT KNOOP,
OTTO SCHWEITZER,
By Bailey & Larami
Attorneys Patented Dec. 22, 1942

2,305,804

UNITED STATES PATENT OFFICE 2,305,804

LAMINATED COATING

Eugen Bentz, Koblenz, Hans Burck, Baumbach, Fritz Heinrich, Selters, and Johannes Jaenicke, Hermann Miedel, Herbert Knoop, and Otto Schweitzer, Frankfort-on-the-Main, Germany; vested in the Alien Property Custodian Application January 30, 1939, Serial No. 253,704
In Germany January 26, 1938

4 Claims. (Cl. 94—3)

This invention is directed to the making of laminated coatings or coverings with the use of novel compositions of synthetic materials.

In the prior art, laminated coatings or coverings made to provide waterproof and wearproof surfaces for receptacles, pipes, floors, and the like, were commonly composed of rubber cement mixtures. One such prior art covering comprises a first layer of a milk of rubber composition, a second layer of natural rubber, or a layer having a high content of rubber, and a third layer composed of a material adapted to resist chemical corrosion, or mechanical wear. The use of such rubber materials is disadvantageous because of their expense, and because of their inability to withstand the effects of use, as well as their limitation to certain types of products.

An object of the instant invention is to make a type of coating which is usable for many different purposes.

Another object of the invention is to make a laminated coating material composed of layers of varying compositions of synthetic materials.

Another object of the invention is to make a laminated coating of synthetic resin and/or synthetic rubber compositions which can take the place of a natural rubber coating, and at the same time are resistant to acids and wear which would destroy natural rubber compositions.

A further object of the invention is to make a laminated coating of synthetic material such as synthetic resin which has the protective characteristic of natural rubber and, in addition, has greater resistance to aging and to wear than natural rubber coatings.

Another object of the invention is to make a laminated coating in which each of the layers consists of a mixture of at least one synthetic resin and/or rubber and cement, the cement content being varied in at least some of the adjacent layers of the coating.

These and other objects of the invention may be more readily understood with reference to the following figures, in which:

Fig. 1 is a cross-sectional view through a laminated coating made according to the invention.

Fig. 2 is a cross-sectional view of a modified laminated coating applied to an iron base.

Fig. 3 is a cross-sectional view of a metal receptacle having another modified laminated coating thereon; and Fig. 4 is a cross-sectional view of a floor having another modified laminated coating thereon.

The laminated coatings shown in the various figures are made up in part by layers each composed of synthetic materials and cement, with the addition of fillers and softening agents if desired. In each of the layers, one or more of the following synthetic materials may be used: Preparations of acrylic ester polymerization products, as Acronal, or Plexigum, polyvinyl esters, as Mowilith or Vinapas; polymerized vinyl derivatives, as polyvinyl chloride known as Igelit; polyvinyl mixed polymerisation products or polyacrylic mixed polymerisation products; polyisobutylene; cumaron resins; synthetic rubber materials such as butadiene polymerisation products, or mixed polymerisation products such as butadiene with styrol or acrylic acid nitrile known as Buna, and chloroprene polymerisation products; thioplasts, as condensation products of organic dihalogenides such as beta-beta-dichlordiethyl ether with alkalipolysulfide such as sodium trisulfide. All of these named synthetic materials come within the general classes of ethylene polymerisates and thioplasts.

The following well known softening agents can be used: Phthalic acid butyl ester, tricresyl phosphate, triacetine, tributyl phosphate, butyl stearate, dibutyl phthalate.

The cements which can be used, it being noted that when the term "cement" is used in the description of this invention, it means all hydraulic setting mortars, include alumina cement, Portland cement, calcined gypsum. The aqueous dispersions of these cements can be stabilized in any conventional manner. In general, each composition is produced by mixing cement with an aqueous dispersion of a synthetic material, and, if desired, with added dispersions of rubber or regenerated rubber. The cement and synthetic material are mixed in such proportions that the mixture gels without an appreciable evaporation of water, and the gelled mixture is subsequently dried as a layer of the laminated coating. Fillers, such as quartz powder, slate powder, or kaolin can be added to the mix of synthetic material and cement.

Such a composition is shown as the lowest layer 2 of the laminated coating in Fig. 1. The layer 4 can be a similar mix in the form of a sheet adhesively united to layer 2, although this layer can be made from a solution of the mix and sprayed upon layer 2. The layer 6 is a corrosive and wear resistant material and can be composed of ceramic plates cemented to layer 4. In place of ceramic plates, a jointless surface can be created upon the layer 4 by making layer 6 of soft or hard rubber. Layers 2 and 4 must be resilient, whereas the upper layers 6 can be of a hard, easily cleaned material.

A second form of the invention is shown in Fig. 2, in which, in order to obtain proper degrees of resiliency, and adhesiveness, the layers are given varying cement contents. As shown in Fig. 2, an iron plate 8 is given a laminated coating composed of layers 10 and 12. Coating 10 consists of a first strata $a$ of synthetic material and cement mixture, and having a relatively high proportion of cement therein, whereas strata $b$ has a cement content less than that contained in strata $a$. Similarly, layer 12 is composed of strata $c$ and $d$ with the strata $c$ having a cement content greater than the strata $d$, but less than the cement content in the composition of strata $b$. In other words, the cement content of the various strata comprising the layers coating the metal sheet 8 is less as the strata extend outwardly of sheet 8. This provides a coating which gives the desired adhesiveness to metal sheet 8, and which, at the same time, is progressively more resilient as it extends outward from metal sheet 8.

A more specific application of the coating composition is shown in Fig. 3, wherein a metal container 14 is given a laminated coating. The first coating 16 upon the inner walls of vessel 14 is composed of a strata $e$ lying next to the metal walls. Strata $e$ is about 2 mm. thick, and has the following composition:

|  | Parts by weight |
|---|---|
| A 75% rubber of milk concentrate | 100 |
| A 50% dispersion of polyacrylic acid methyl ester | 50 |
| Sulfur | 3 |
| Zinc oxide | 5 |
| Vulkazit 576 (condensation product homologue acroline with aromatic bases) | 1 |
| 10% ammoniacal casing solution | 15 |
| Quartz powder | 260 |
| Portland cement | 65 |

This strata is applied by means of a trowel or spatula and is allowed to dry at room temperature for a few hours.

A second strata $f$ is then similarly placed on top of strata $e$, is about 5 mm. thick, and has the following composition:

|  | Parts by weight |
|---|---|
| A 75% rubber of milk concentrate | 65 |
| A 50% dispersion of polyacrylic acid ethyl ester | 100 |
| Sulfur | 2 |
| Zinc oxide | 3 |
| Vulkazit 576 | 1 |
| 10% ammoniacal casein solution | 12 |
| Quartz sand | 200 |
| Quartz powder | 100 |
| Portland cement | 40 |

Strata $f$ is dried for about two days, and it is noted that it has a less cement content than the strata $e$.

Upon strata $f$ is sprayed a layer 18 composed of a 25% dispersion of polyvinyl acetate treated with a conventional softening agent, this latter being about 1 mm. thick. When this layer is applied, the whole vessel is well dried, preferably by heating at a temperature as high as 50° C., and vulcanized.

Finally, a layer 20 is placed over the layer 18, this layer being a thick layer of 5 mm. and composed of a hardening synthetic resin having the following composition:

|  | Parts by weight |
|---|---|
| Liquid phenolformaldehyde resin | 30 |
| Fine sand | 27 |
| Quartz powder | 40 |
| Hardening accelerator (for example ethyl sulfuric acid) | 3 |

This last layer hardens with a smooth corrosive and wear resistant surface after about 24 hours, and the vessel is then ready for use. The coating is resistant to acids which are destructive to natural rubber, and has excellent wearing characteristics.

In Fig. 4, the manner of applying the laminated coating to form a floor covering is shown. Upon the concrete floor 22 there is first placed a mixture 24 having the following composition:

|  | Parts by weight |
|---|---|
| A 60% dispersion of a condensate of dichlordiethyl ether and Na tetrasulfide | 150 |
| Zinc oxide | 10 |
| Vulkazit P extra N (accelerator) | 3 |
| 10% ammoniacal casein solution | 10 |
| Quartz powder | 250 |
| Portland cement | 50 |

This layer is about 10 mm. thick and is allowed to dry for about 8 hours. An adhesive coating 26 composed of polyisobutylene in a benzol solution is placed on layer 24, by means of which plates forming layer 28 are adhesively attached to layer 24. Said plates are composed of polymerised vinyl derivatives such as polyisobutylene rolled to a 1 mm. thickness. These vinyl derivatives are ethylene polymerisates. The joints between these plates are preferably sealed and made smooth by passing a hot roller over the surface of the plates. For the surface layer 30, ceramic plates are adhesively united to the layer 28. This provides a flooring which is not only wear resistant, but protects the concrete floor 22 from acid attack.

Thus, in each example, a laminated coating is produced which is capable of resisting the chemical corrosion as well as mechanical wear. Rubber can be replaced by entirely synthetic materials as synthetic resins or synthetic rubber, and natural rubber can be employed to some extent in the compositions. The compositions are extraordinarily stable and durable, and are resistant to chemicals which would destroy rubber, and, at the same time, the coating can be successfully applied where natural rubber compositions would fail.

Furthermore, the materials employed can be produced in countries which do not have ready access to sources of natural rubber grown only in tropical countries.

Having now described means by which the objects of this invention may be obtained, what we claim is:

1. An acid resistant laminated floor covering comprising a floor base, a first layer upon said base composed of a synthetic resin and hydraulic cement, a second layer of rolled plates of polymerized vinyl derivatives adhesively secured to said first layer, and a third layer composed of ceramic tiles adhesively united to said second layer.

2. A laminated covering applied to a base comprising a first layer applied to the base composed of hydraulic cement and a synthetic material selected from the group consisting of ethylene polymerisates and thioplasts, a second layer composed of an ethylene polymerisate, and a third surface layer of tile.

3. A laminated covering as in claim 2, said third layer consisting of ceramic tile.

4. A laminated covering as in claim 2, said first and second layers each being composed of strata containing hydraulic cement, the hydraulic cement content thereof increasing toward said base.

EUGEN BENTZ.
HANS BURCK.
FRITZ HEINRICH.
JOHANNES JAENICKE.
HERMANN MIEDEL.
HERBERT KNOOP.
OTTO SCHWEITZER.